US008755850B2

(12) United States Patent
Kang (10) Patent No.: US 8,755,850 B2
(45) Date of Patent: Jun. 17, 2014

(54) MOBILE COMMUNICATION TERMINAL HAVING CONVERSION LENS AND PHOTOGRAPHY METHOD USING THE SAME

(75) Inventor: Byung-Kwon Kang, Suwon-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 558 days.

(21) Appl. No.: 12/276,508

(22) Filed: Nov. 24, 2008

(65) Prior Publication Data

US 2009/0143099 A1    Jun. 4, 2009

(30) Foreign Application Priority Data

Nov. 30, 2007    (KR) .................... 10-2007-00123422

(51) Int. Cl.
    *H04M 1/00*    (2006.01)
(52) U.S. Cl.
    USPC ....................................... 455/575.1; 455/557
(58) Field of Classification Search
    USPC .............................................. 455/556.1, 557
    See application file for complete search history.

(56) References Cited

U.S. PATENT DOCUMENTS

| 5,371,566 | A  | * | 12/1994 | Asakura ........................ 396/71 |
| 7,604,423 | B2 | * | 10/2009 | Nagata et al. ................. 396/529 |
| 2004/0252987 | A1 | * | 12/2004 | Kobayashi ....................... 396/6 |
| 2005/0243191 | A1 | * | 11/2005 | Itoh et al. ................. 348/231.99 |
| 2009/0109558 | A1 | * | 4/2009 | Schaefer ....................... 359/827 |

OTHER PUBLICATIONS

U.S. Appl. No. 60/982,622, filed Oct. 25, 2007.*

* cited by examiner

*Primary Examiner* — Lincoln Donovan
*Assistant Examiner* — Diana J Cheng
(74) *Attorney, Agent, or Firm* — Cha & Reiter, LLC (57) ABSTRACT

Provided are a mobile communication terminal and a photography method for the same using a conversion lens. The mobile communication terminal includes a terminal body, a camera assembly installed at one side of the terminal body and a conversion lens detachably installed on a front surface of the camera assembly, wherein product data of the conversion lens mounted on the camera assembly are automatically identified and a microcomputer installed in the terminal body automatically adjusts a photography mode such that a special photography mode is entered without requiring any professional knowledge.

18 Claims, 8 Drawing Sheets

MOBILE COMMUNICATION TERMINAL HAVING CONVERSION LENS AND PHOTOGRAPHY METHOD USING THE SAME

CLAIM OF PRIORITY

This application claims the benefit of the earlier filing date, under 35 U.S.C. §119(a) to that patent application entitled "MOBILE COMMUNICATION TERMINAL HAVING CONVERSION LENS AND PHOTOGRAPHY METHOD USING THE SAME " filed on Nov. 30, 2007 and assigned Ser. No. 2007-123422, the entire contents of which are hereby incorporated herein by reference.

BACKGROUND OF THE INVENTION

1. Field of the Invention

The present invention relates to a mobile communication terminal and more particularly, to a mobile communication terminal having a conversion lens and a photography method using the same, to selectively perform general photography or special photography depending on a user's necessity.

2. Description of the Related Art

Mobile communication services using mobile communication terminals (or mobile wireless terminals) have been grown from simple pager services to voice call and simple message services. In recent times, such services have diversified to include multimedia services such as motion picture service, for example, video call, and video on demand (VOD).

With the diversification of the mobile communication services, additional functions and devices for providing the services are needed. For example, in the case of a camera lens assembly used for photography or voice call, it has become an essential element of the mobile communication terminal.

In addition, the camera lens assembly mounted in the mobile communication terminal can also make the mobile communication terminal perform functions of a digital camera.

Figure 1:
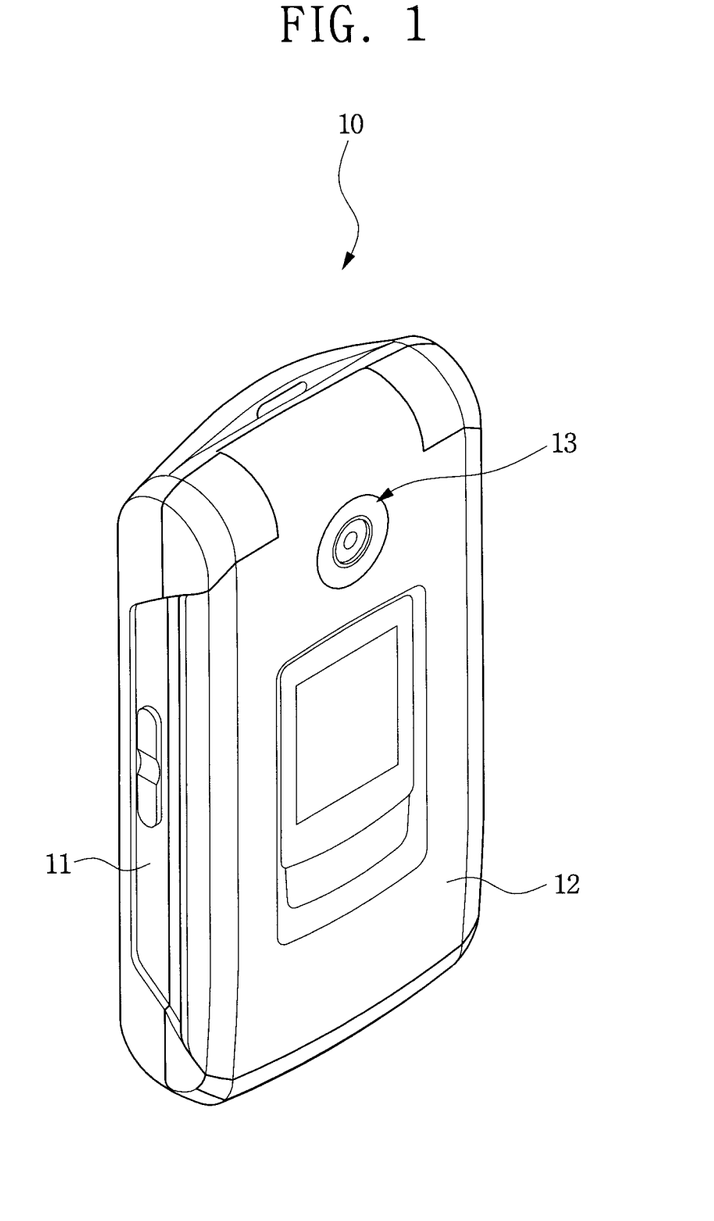
FIG. 1 is a perspective view of a conventional mobile communication terminal including a camera assembly.

FIG. 1 is a perspective view of a conventional mobile communication terminal including a camera assembly.

Referring to FIG. 1, the conventional mobile communication terminal 10 including a camera assembly includes a terminal body 11, a cover 12, which may include a display part, pivotally installed on the terminal body 11, and a camera assembly 13 installed at the cover 12 or the terminal body 11.

However, since the camera assembly mounted in the terminal body of the conventional mobile communication terminal has a restricted photographing angle within a standard set on manufacturing principles, it is difficult to use the terminal for close-up photography or long-distance photography.

SUMMARY OF THE INVENTION

The present invention provides a mobile communication terminal having a conversion lens and a photography method using the same, capable of performing general photography using a camera assembly installed at a terminal body and special photography using a conversion lens mounted in the front of the camera assembly, thereby enabling free selection of a photography mode depending on a user's preference or necessity.

According to an aspect of the present invention, there is provided a mobile communication terminal including a terminal body, a camera assembly installed at one side of the terminal body and a conversion lens detachably installed on a front surface of the camera assembly.

The camera assembly may have a locking groove formed in the front surface thereof such that the conversion lens is detachably attached thereto, and the conversion lens may have a locking hook to correspond to the locking groove.

The camera assembly may have a position fixing groove formed in the front surface thereof, and the conversion lens may have a position fixing projection to correspond to the position fixing groove.

A data identification unit may be installed between the camera assembly and the conversion lens to identify data of the conversion lens, and an example of the data identification unit may include a magnetization part installed at one side of the conversion lens and a hole sensor installed inside the camera assembly to detect the magnetization part.

Another example of the data identification unit may include a plurality of magnets installed at one side of the conversion lens at equal intervals and a hole sensor installed inside the camera assembly to detect the magnets.

According to another aspect of the present invention, there is provided a mobile communication terminal including a terminal body, a camera assembly installed at one side of the terminal body and a conversion lens detachably installed on a front surface of the camera assembly. Here, a female threaded part is formed in the front surface of the camera assembly such that the conversion lens is detachably installed to the camera assembly, and a male threaded part is formed at the conversion lens to correspond to the female threaded part.

According to still another aspect of the present invention, there is provided a mobile communication terminal including a terminal body, a camera assembly installed at one side of the terminal body and a conversion lens detachably installed on a front surface of the camera assembly. Here, a plate is installed at the front surface of the camera assembly such that the conversion lens is detachably installed to the camera assembly, and a magnet is installed at the conversion lens to correspond to the plate.

According to yet another aspect of the present invention, there is provided a photography method for a mobile communication terminal including the steps of driving a camera assembly installed at a terminal body, determining whether a conversion lens is mounted or not, performing general photography when it is determined that the conversion lens is not mounted, reading data of the conversion lens when it is determined that the conversion lens is mounted and performing special photography using the conversion lens depending on the reading of the data of the conversion lens.

In determining whether the conversion lens is mounted, first and second hole sensors installed inside the camera assembly may detect first and second magnets, respectively, installed at the conversion lens. Here, it may be determined that the conversion lens is not mounted when the first and second hole sensors do not detect the first and second magnets, respectively.

In reading the data of the conversion lens, first and second hole sensors installed inside the camera assembly may detect first and second magnets installed at the conversion lens, respectively. Here, it may be determined that a wide-angle lens of the conversion lens is mounted when only the first hole sensor detects only the first magnet, that a telephoto lens of the conversion lens is mounted when only the second hole sensor detects only the second magnet, and that a filter is mounted when the first and second hole sensors detect the first and second magnets, respectively.

In performing the special photography using the conversion lens, when image distortion is generated, a portion in which the image distortion is generated may be removable from a display image detected by an image sensor.

BRIEF DESCRIPTION OF THE DRAWINGS

A more complete appreciation of the invention, and many of the attendant advantages thereof, will be readily apparent as the invention becomes better understood by reference to the following detailed description when considered in conjunction with the accompanying drawings, in which like reference symbols indicate like components, wherein.

DETAILED DESCRIPTION OF THE INVENTION

Reference will now be made in detail to the embodiments of the present invention, examples of which are illustrated in the accompanying drawings. The embodiments are described below in order to explain the present invention by referring to the figures.

Figure 2:
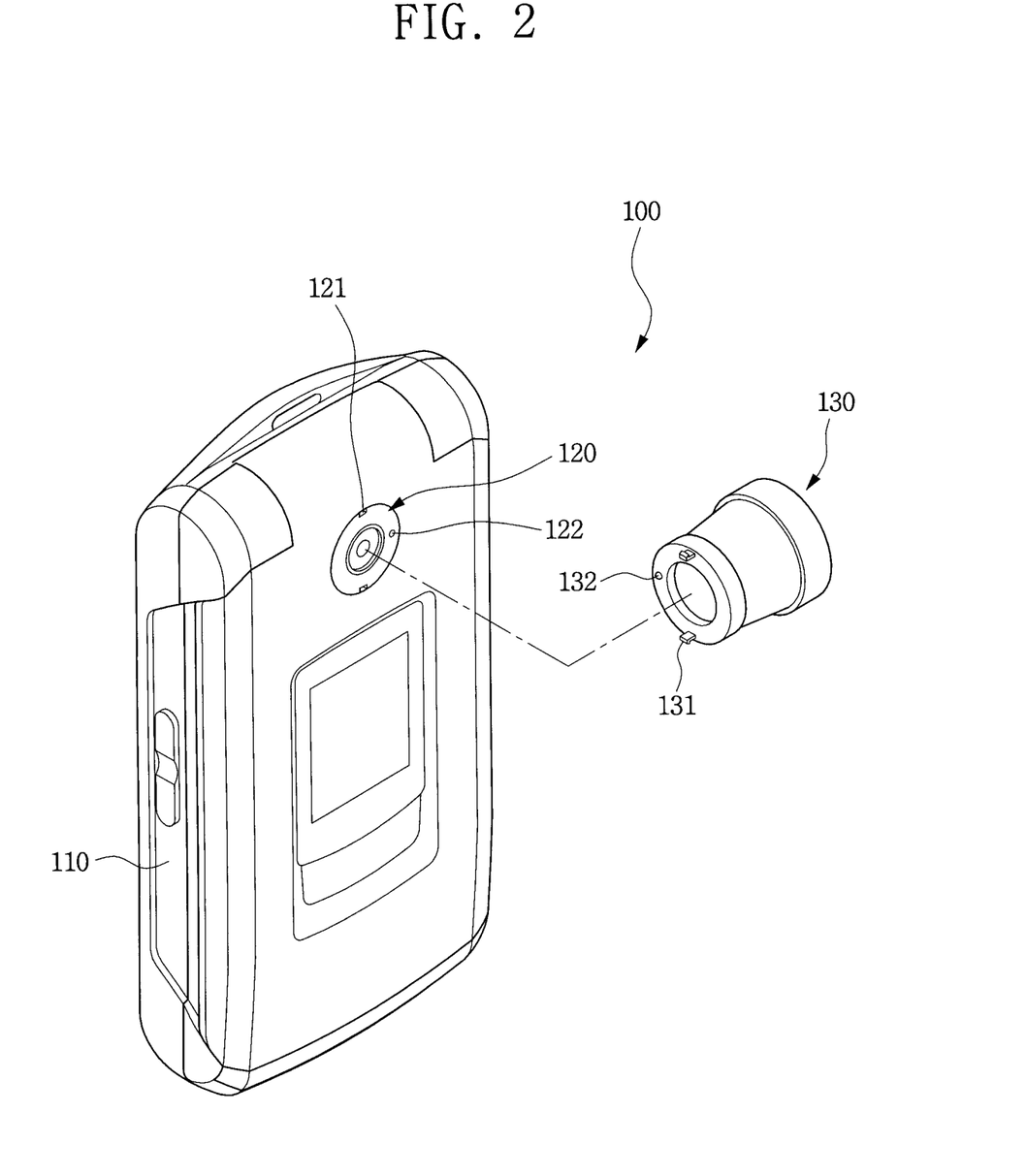
FIG. 2 is an exploded perspective view of a mobile communication terminal in accordance with an exemplary embodiment of the present invention.
Figure 3:
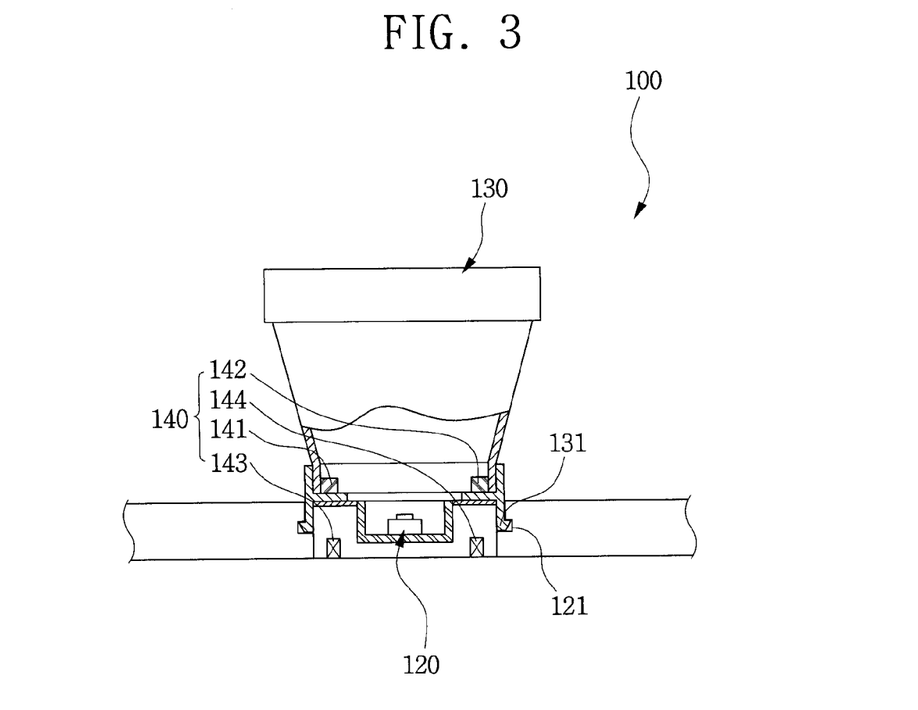
FIG. 3 is a longitudinal cross-sectional view of the mobile communication terminal in accordance with an exemplary embodiment of the present invention.
Figure 4:
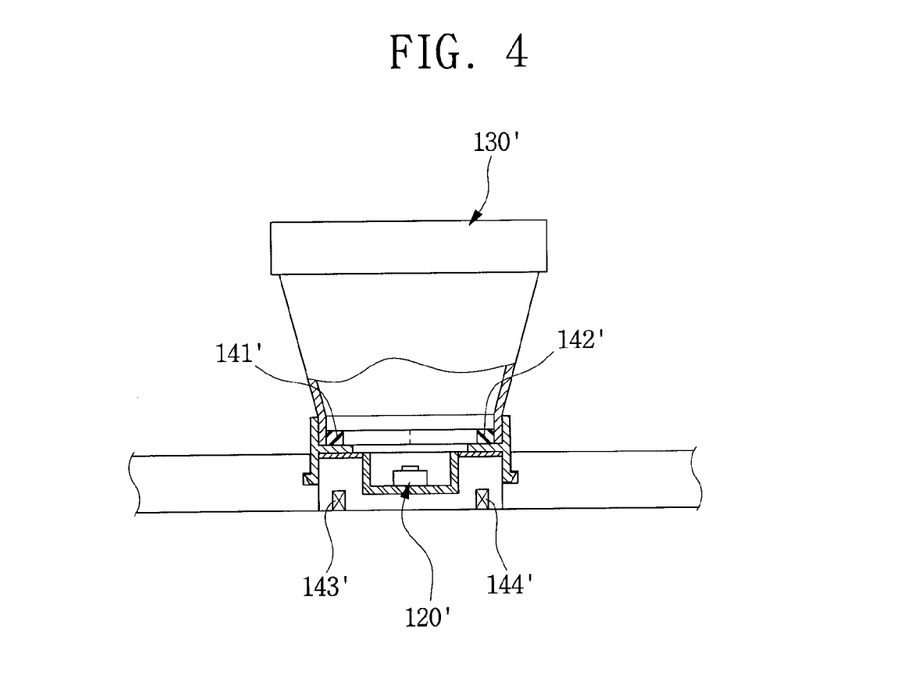
FIG. 4 is a longitudinal cross-sectional view of another example of a data identification unit of the mobile communication terminal in accordance with an exemplary embodiment of the present invention.

FIG. 2 is an exploded perspective view of a mobile communication terminal in accordance with an exemplary embodiment of the present invention, FIG. 3 is a longitudinal cross-sectional view of the mobile communication terminal in accordance with an exemplary embodiment of the present invention, and FIG. 4 is a longitudinal cross-sectional view of another example of a data identification unit of the mobile communication terminal in accordance with an exemplary embodiment of the present invention.

Referring to FIGS. 2 and 3, the mobile communication terminal 100 in accordance with an exemplary embodiment of the present invention includes a terminal body 110, a camera assembly 120 installed at one side of the terminal body 110, and a conversion lens 130 detachably installed on a front surface of the camera assembly 120.

For reference, in addition to a general standard lens, a wide-angle lens, a telephoto lens, and other such photography lenses, and also including a fisheye lens having a photographing angle of 180°, a micro lens designed for close-up photography or enlarged photography, a zoom lens that can continuously change a focus length, a reflective telephoto lens using a mirror, and various auxiliary lenses may be used with the lens for the camera. The conversion lens disclosed in the present invention is used as a general concept including such lenses.

A locking groove 121 may be formed in the front surface of the camera assembly 120 such that the conversion lens 130 can be detachably attached to the camera assembly 120, and a locking hook may be formed at the conversion lens 130 to correspond to the locking groove 121.

A position fixing groove 122 may be formed in the front surface of the camera assembly 120, and a position fixing projection 132 may be formed on the conversion lens 130 to correspond to the position fixing groove 122.

A data identification unit 140 (FIG. 3) may be installed between the camera assembly 120 and the conversion lens 130 to identify data of the conversion lens 130.

Here, the term data refers to a manufacturing company of the conversion lens, the kind of the conversion lens, for example, a general lens, a wide-angle lens, a telephoto lens, and other similar type information that may be used to identify the conversion lens.

An example of the data identification unit 140 may include first and second magnets 141 and 142 installed at one side (plane) of the conversion lens 130 at equal intervals, and first and second hole sensors 143 and 144 installed inside the camera assembly 120.

Referring to FIG. 4, another example of the data identification unit may include magnetization parts 141' and 142' installed at one side of the conversion lens 130'; and hole sensors 143' and 144' installed inside the camera assembly 120' to detect the magnetization parts 141' and 142'. Here, the magnetization parts 141' and 142' have a structure in which an N-polarity and an S-polarity are magnetized to a ring-shaped member.

In accordance with the present invention, general photography may be performed using the camera assembly 120 installed in the terminal body 110, or special photography may be performed using a conversion lens separately mounted on the front surface of the camera assembly 120.

In addition, when the conversion lens 130 is mounted on the front surface of the camera assembly 120 to perform special photography, since product data of the conversion lens 130 are automatically identified and a microcomputer (not shown) installed in the terminal body 110 is automatically adjusted, a general user can also readily perform the special photography without any professional knowledge.

Structures for mounting the conversion lens on the camera assembly may be variously employed in addition to the aforementioned hook structure, and therefore, a threaded structure and a magnetic structure, as other examples of the structures, will be described in detail.

Figure 5:
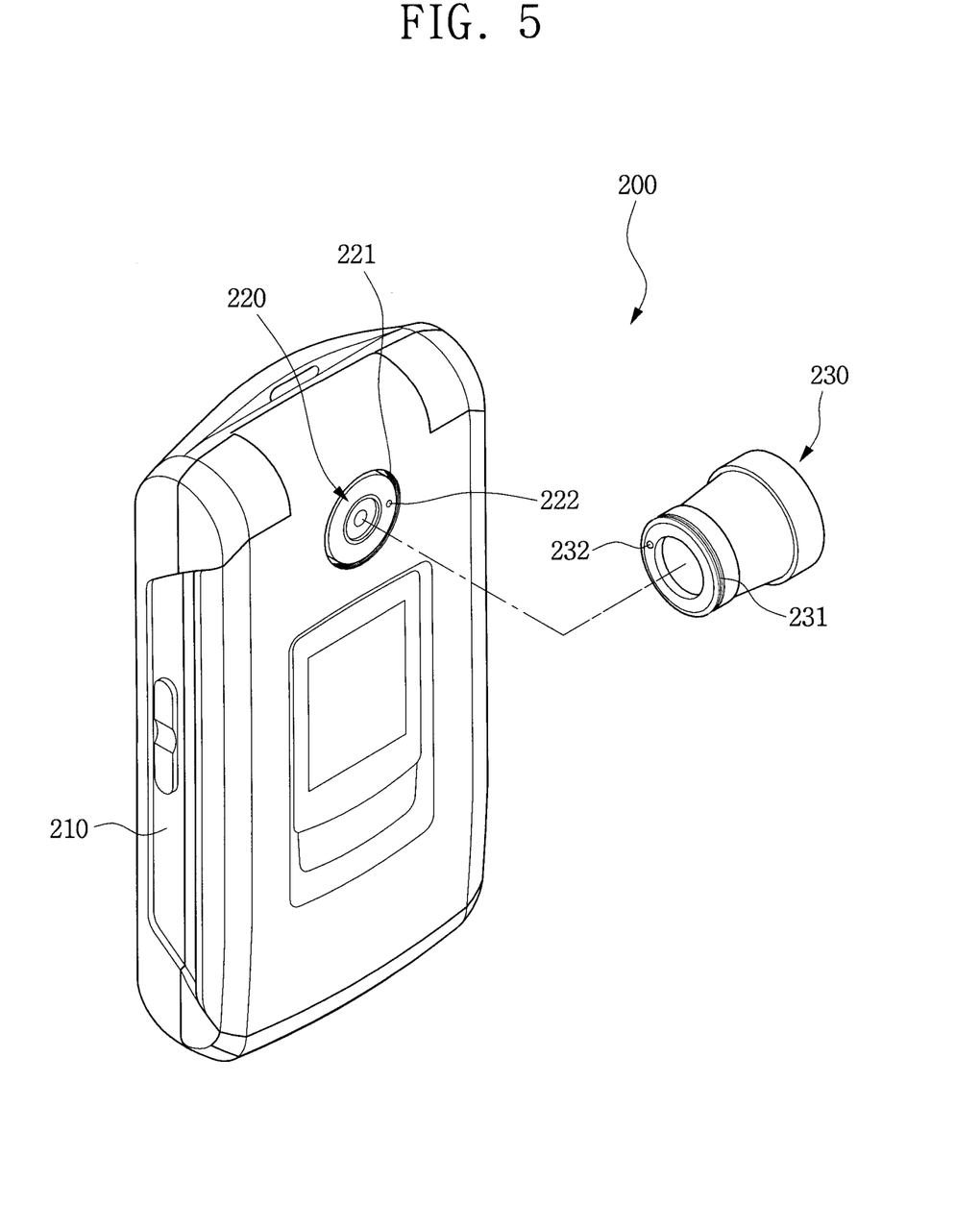
FIG. 5 is an exploded perspective view of a mobile communication terminal in accordance with another exemplary embodiment of the present invention.
Figure 6:
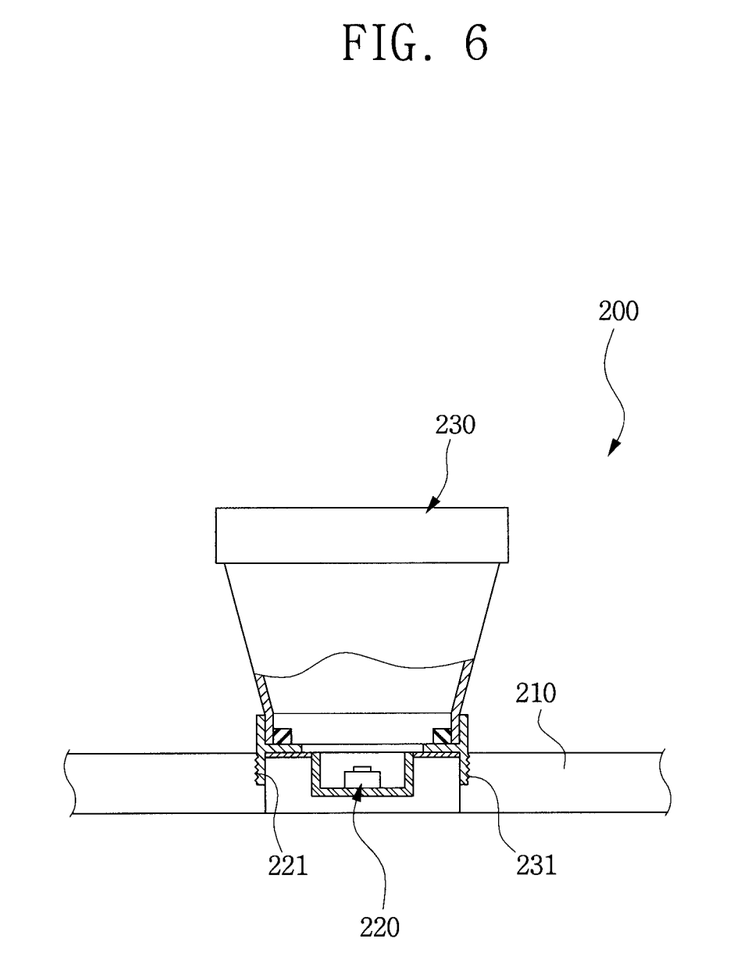
FIG. 6 is a longitudinal cross-sectional view of the mobile communication terminal in accordance with another exemplary embodiment of the present invention.

FIG. 5 is an exploded perspective view of a mobile communication terminal in accordance with another exemplary embodiment of the present invention, and FIG. 6 is a longitudinal cross-sectional view of the mobile communication terminal in accordance with another exemplary embodiment of the present invention.

Referring to FIGS. 5 and 6, a mobile communication terminal 200 in accordance with another exemplary embodiment of the present invention includes a terminal body 210, a camera assembly 220 installed at one side (plane) of the terminal body 210; a conversion lens 230 detachably installed on a front surface of the camera assembly 220, wherein a female threaded part 221 is formed in the front surface of the camera assembly 220 and a male threaded part 231 is formed at the conversion lens 230 to correspond to the female threaded part 221, such that the conversion lens 230 is detachably attached to the camera assembly 220.

A position fixing groove 222 may be formed in the front surface of the camera assembly 220, and a position fixing projection 232 may be formed at the conversion lens 230 to correspond to the position fixing groove 222.

In the mobile communication terminal in accordance with another exemplary embodiment of the present invention, the female threaded part 221 may be formed in the front surface of the camera assembly 220 and the male threaded part 231 may be formed at the conversion lens 230, and vice versa.

Figure 7:
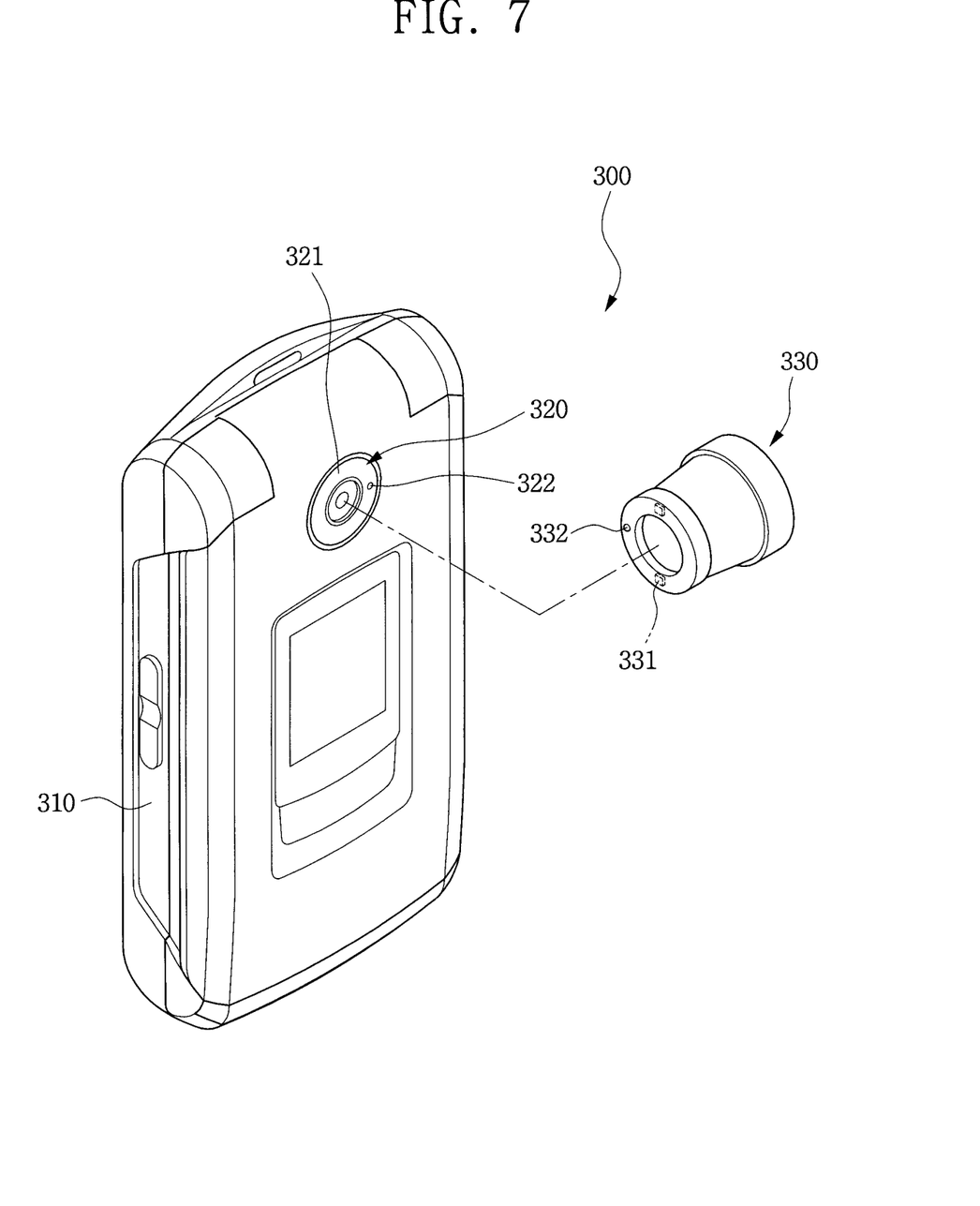
FIG. 7 is an exploded perspective view of the mobile communication terminal in accordance with still another exemplary embodiment of the present invention.
Figure 8:
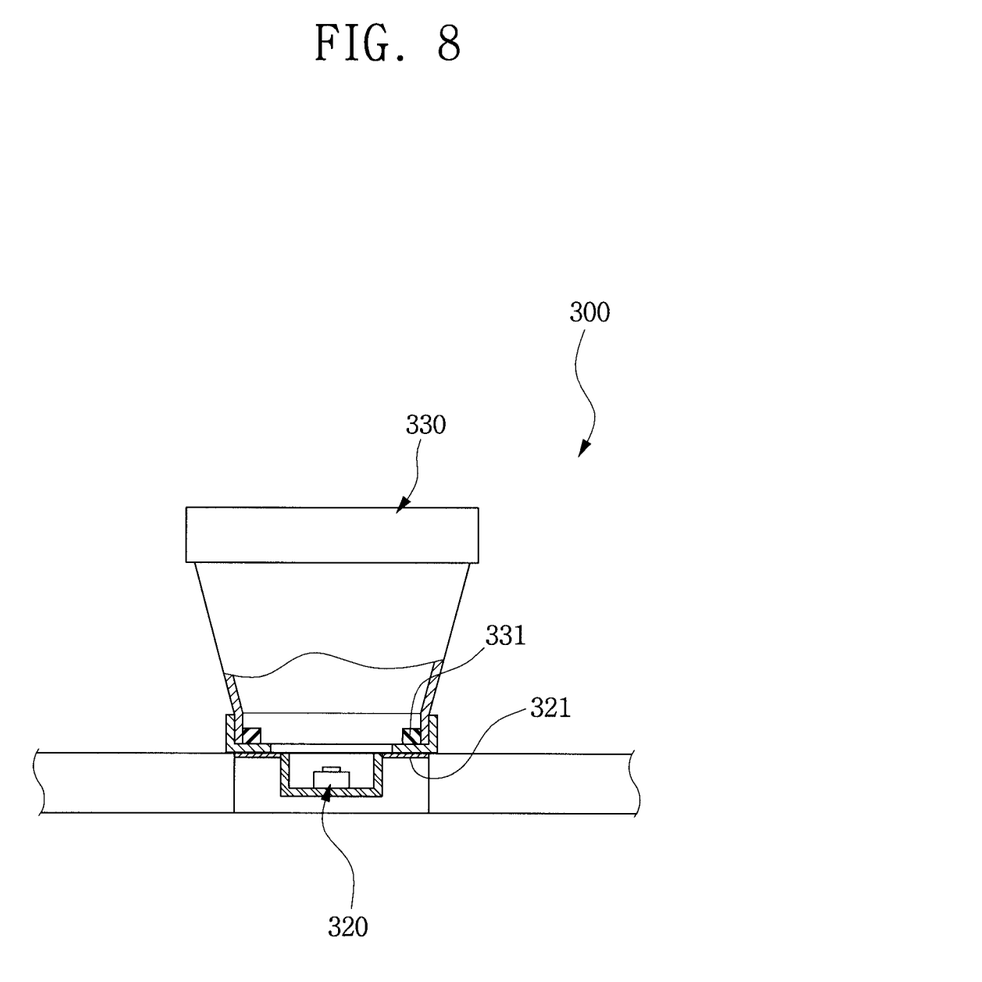
FIG. 8 is a longitudinal cross-sectional view of the mobile communication terminal in accordance with still another exemplary embodiment of the present invention.

FIG. 7 is an exploded perspective view of the mobile communication terminal in accordance with still another exemplary embodiment of the present invention, and FIG. 8 is a longitudinal cross-sectional view of the mobile communication terminal in accordance with still another exemplary embodiment of the present invention.

Referring to FIGS. 7 and 8, a mobile communication terminal 300 in accordance with still another exemplary embodiment of the present invention includes a terminal body 310, a camera assembly 320 installed at one side of the terminal body 310; a conversion lens 330, a plate 321 installed on the front surface of the camera assembly 320 such that the conversion lens 330 is detachably attached to the camera assembly 320, and a magnet 331 is installed at the conversion lens 330 to correspond to the iron plate 321.

A position fixing groove 322 may be formed in the front surface of the camera assembly 320, and a position fixing projection 332 may be formed at the conversion lens 330 to correspond to the position fixing groove 322.

Hereinafter, a process of performing general photography using the camera assembly installed at the terminal body 110 and special photography using the conversion lens 130 separately mounted on the front surface of the camera assembly 120 depending on a user's preference or necessity will be described.

Figure 9:
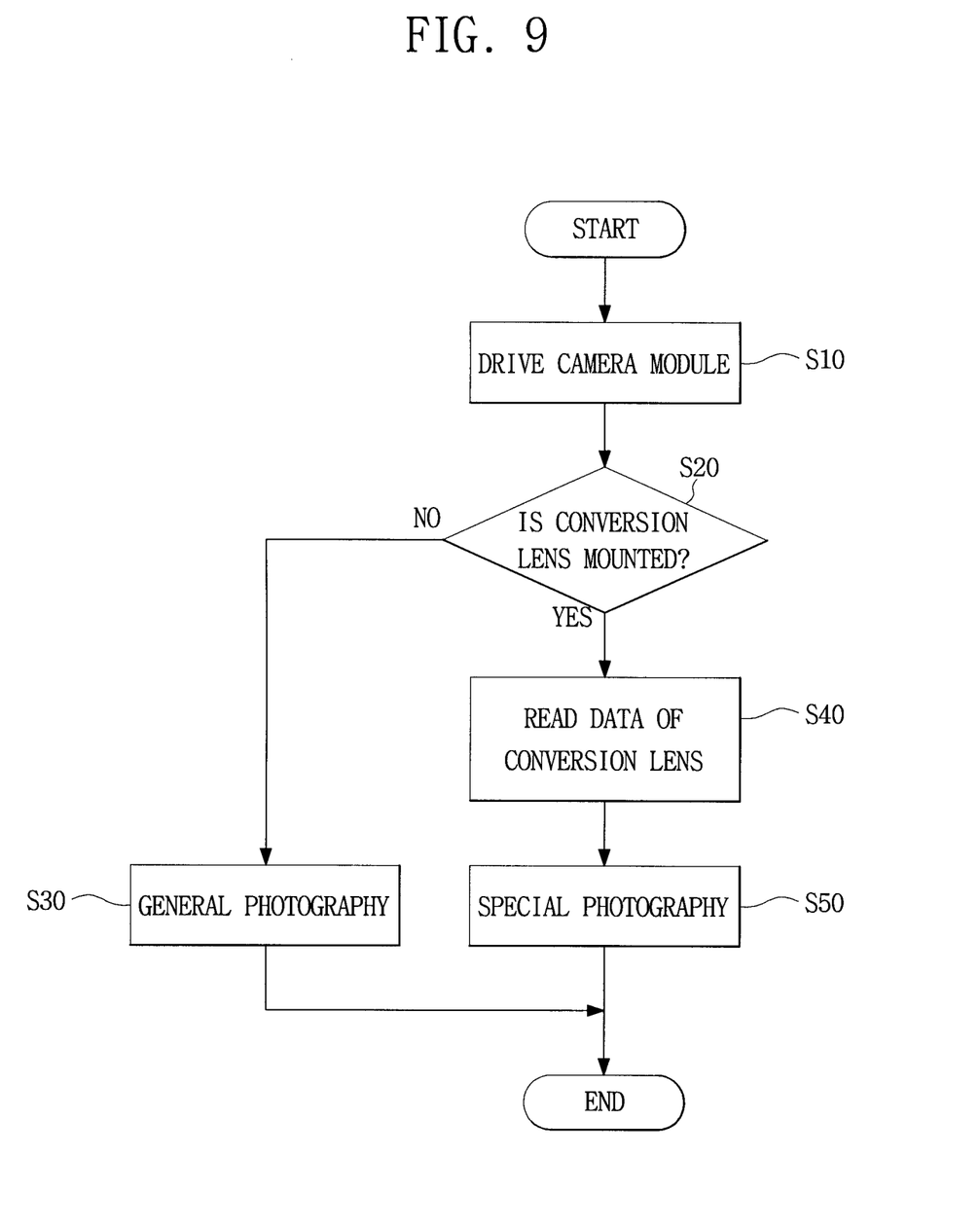
FIG. 9 is a flowchart showing a photography method for a mobile communication terminal in accordance with an exemplary embodiment of the present invention.

FIG. 9 is a flowchart showing a photography method for a mobile communication terminal in accordance with an exemplary embodiment of the present invention.

Referring to FIG. 9, a photography method for a mobile communication terminal in accordance with an exemplary embodiment of the present invention includes: driving a camera assembly (S10), determining whether a conversion lens is mounted (S20); performing general photography when it is determined that the conversion lens is not mounted (S30), reading data of the conversion lens when it is determined that the conversion lens is mounted (S40) and performing special photography using the conversion lens as a result of the reading of the data of the conversion lens (S50).

In determining whether the conversion lens is mounted (S20), first and second hole sensors installed inside the camera assembly detect first and second magnets installed at the conversion lens, respectively, wherein it is determined that the conversion lens is not mounted when the first and second hole sensors do not detect the first and second magnets, respectively.

In reading the data of the conversion lens (S40), first and second hole sensors installed inside the camera assembly detect first and second magnets installed at the conversion lens, respectively, wherein it is determined that a wide-angle lens of the conversion lens is mounted when only the hole sensors detects only the first magnet, it is determined that a telephoto lens of the conversion lens is mounted when only the hole sensor detects only the second magnet, and it is determined that a filter is mounted when the first and second hole sensors detect the first and second magnets, respectively. This exemplary determination of a type of attached lens is summarized in Table 1, wherein an "X" indicates the detection of a corresponding element. Although, the configuration shown in Table 1 represents a preferred embodiment of the invention claimed, it would be recognized by those skilled in the art that other arrangements may be developed without undue experimentation. Such other arrangements have been contemplated and are considered with the scope of the invention claimed.

TABLE 1

| First hole sensor detects first magnet | Second hole sensor detects second magnet | Determination |
|---|---|---|
| X | O | Telephoto lens |
| O | X | Wide-angle lens |
| O | O | General photography |
| X | X | Filter |

In performing the special photography using the conversion lens (S50), when image distortion is generated, a portion in which the image distortion is generated can be removed from a display image detected by an image sensor.

As can be seen from the foregoing, general photography can be performed using a camera assembly installed at a terminal body, or special photography can be performed using a conversion lens separately installed on a front surface of the camera assembly, depending on a user's necessity.

In addition, when the conversion lens is mounted on the front surface of the camera assembly to perform the special photography, since product data of a conversion lens mounted on the camera assembly are automatically identified and a microcomputer installed in the terminal body automatically adjusts a photography mode (i.e., the setting of the combined internal camera lens and the attached lens), a general user can readily perform the special photography without any professional knowledge.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been disclosed for illustrative purposes, those skilled in the art will appreciate that various modifications, additions, and substitutions are possible, without departing from the scope of the present invention. For example, although the description of the invention has been made with regard to two inputs, it would be recognized by those skilled in the art that the number of independent inputs may be increased without altering the scope of the invention. In another example, each input may convey more than one type of information based on particular lens configuration (e.g., a conversion lens input may also include information regarding a telescopic level of a telescopic lens). Therefore, the present invention is not limited to the above-described embodiments, but is defined by the following claims, along with their full scope of equivalents.

What is claimed is:

1. A mobile communication terminal comprising:
a terminal body;
a camera assembly installed at one side of the terminal body;
a conversion lens detachably installed on a front surface of the camera assembly;
a data identification unit provided between the camera assembly and the conversion lens to identify a type of the conversion lens, comprising a magnetization part installed at one side of the conversion lens, wherein the magnetization part includes a plurality of magnets disposed at different locations in the magnetization part and arranged to form a magnetic pattern corresponding to the conversion lens; and
one or more sensors installed inside the camera assembly and arranged to detect whether a magnet is present at each of a plurality of locations in the magnetization part.

2. The mobile communication terminal according to claim 1, wherein the camera assembly has a locking groove formed in the front surface thereof such that the conversion lens is detachably attached thereto, and the conversion lens has a locking hook to correspond to the locking groove.

3. The mobile communication terminal according to claim 2, wherein the camera assembly has a position fixing groove formed in the front surface thereof, and the conversion lens has a position fixing projection to correspond to the position fixing groove.

4. The mobile communication terminal according to claim 1, wherein the camera assembly has a female threaded part formed in the front surface thereof such that the conversion lens is detachably attached thereto, and the conversion lens has a male threaded part to correspond to the female threaded part.

5. The mobile communication terminal according to claim 1, wherein the camera assembly has a plate installed on the front surface thereof such that the conversion lens is detachably attached thereto, and the conversion lens has a magnet mounted thereon to correspond to the plate.

6. The mobile communication terminal according to claim 1, wherein the data identification unit is installed between the camera assembly and the conversion lens to identify data of the conversion lens.

7. The mobile communication terminal according to claim 1, wherein
the one or more sensors comprise a hole sensor installed inside the camera assembly to detect the magnets.

8. The mobile communication terminal according to claim 1, wherein the setting of the combined camera assembly and the attached conversion lens is automatically adjusted when the conversion lens is mounted on a front of the camera assembly to perform the special photography.

9. A photography method for a mobile communication terminal, comprising the steps of:
driving a camera assembly installed at a terminal body;
determining whether a conversion lens is mounted or not;
performing a general photography using the camera assembly when it is determined that the conversion lens is not mounted;
reading an identification of a type of the conversion lens when it is determined that the conversion lens is mounted on a front of the camera assembly comprising detecting first and second magnets installed at the conversion lens, by the first and second hole sensors installed inside the camera assembly, respectively,
determining that a wide-angle lens of the conversion lens is mounted when only the first hole sensor detects only the first magnet,
determining that a telephoto lens of the conversion lens is mounted when only the second hole sensor detects only the second magnet, and
determining that a filter is mounted when the first and second hole sensors detect the first and second magnets, respectively; and
performing a special photography using the conversion lens depending on the reading of the data of the conversion lens.

10. The photography method according to claim 9, wherein the step of determining whether the conversion lens is mounted comprises the steps of:
detecting first and second magnets installed at the conversion lens by first and second hole sensors installed inside the camera assembly, respectively, and
determining that the conversion lens is not mounted when the first and second hole sensors do not detect the first and second magnets, respectively.

11. The photography method according to claim 9, wherein the step of performing the special photography using the conversion lens comprises the step of, when image distortion is generated, removing the image distortion from a display image detected by an image sensor.

12. The photography method according to claim 9, further comprising automatically adjusting the setting of the combined camera assembly and the attached conversion lens when the conversion lens is mounted on a front of the camera assembly to perform the special photography.

13. An apparatus for managing operation of a camera device within a mobile terminal of the type having a camera assembly within the mobile terminal, a detachable conversion lens, and a data identification unit provided between the camera assembly and the detachable conversion lens to identify a type of the conversion lens, comprising:
a plate assembly having a magnetization part installed at one side of the conversion lens and a sensor installed inside the camera assembly to detect the magnetization part; and
a processor configured to:
receive a first input from said plate assembly, the first input having been generated by a first sensor,
receive a second input from said plate assembly, the second input having been generated by a second sensor,
determine, based on the first input and the second input, whether the camera device is used in a general photography mode or a special photography mode, the special photography mode being one in which the conversion lens is mounted on a front of the camera assembly, and
determine a setting of said camera device, when the camera device is used in the special photography mode to compensate for an element attached to said plate assembly, said element identifying a type of the detachable conversion lens.

14. The apparatus of claim 13, wherein said element is selected from the group of: filter, telephoto lens and wide-angle lens.

15. The apparatus of claim 13, wherein the element is attached via a magnetic attachment.

16. The apparatus of claim 13, wherein the first input and the second input are provided through means selected from the group of: electrical connection, magnetic connection, contactless connection.

17. The apparatus of claim 13, further comprising: an image sensor to monitor a display image.

18. The apparatus of claim 17, wherein the processor is further configured to remove image distortion from said display image detected by said image sensor.

* * * * *